United States Patent [19]

Ballu

[11] Patent Number: 5,373,990
[45] Date of Patent: Dec. 20, 1994

[54] APPARATUS FOR TREATMENT OF VEGETATION

[75] Inventor: Patrick J. Ballu, Reims, France

[73] Assignee: Berthoud S.A., Belleville/Saone, France

[21] Appl. No.: 75,337

[22] Filed: Jun. 11, 1993

Related U.S. Application Data

[63] Continuation-in-part of Ser. No. 767,899, Sep. 30, 1991, abandoned.

[30] Foreign Application Priority Data

Oct. 1, 1990 [FR] France .................. 90 12057

[51] Int. Cl.⁵ .................................. B05B 9/00
[52] U.S. Cl. ...................................... 239/77
[58] Field of Search ............... 239/77, 78, 63, 412, 239/407; 415/130

[56] References Cited

U.S. PATENT DOCUMENTS

| | | | |
|---|---|---|---|
| 2,592,847 | 4/1952 | Babicz | 239/63 X |
| 3,221,993 | 12/1965 | Bals | |
| 3,883,076 | 5/1975 | Vorms et al. | 239/405 X |
| 3,932,054 | 1/1976 | McKelvey | 415/130 |
| 4,609,145 | 9/1986 | Miller | 239/77 |
| 4,749,129 | 6/1988 | Hanson | 239/77 X |
| 5,098,018 | 3/1992 | Habbar et al. | 239/77 |

FOREIGN PATENT DOCUMENTS 2407025 5/1979 France .

*Primary Examiner*—Andres Kashnikow
*Assistant Examiner*—Kevin P. Weldon
*Attorney, Agent, or Firm*—Watson, Cole, Grindle & Watson

[57] ABSTRACT

An apparatus for treatment of vegetation includes a blower (1) which is capable of producing a current of air, a device for atomizing a treatment product in the current of air, a drive shaft (2) for the blower, at least one sensor (16, 16A, 16B) for measuring continuously the speed of rotation of the blower or the flow of the current of air which it produces, means (6, 10, 13) for controlling variations in the speed of rotation of the blower and/or the characteristics of the blower as a function of signals from the sensor and of a set value.

10 Claims, 1 Drawing Sheet

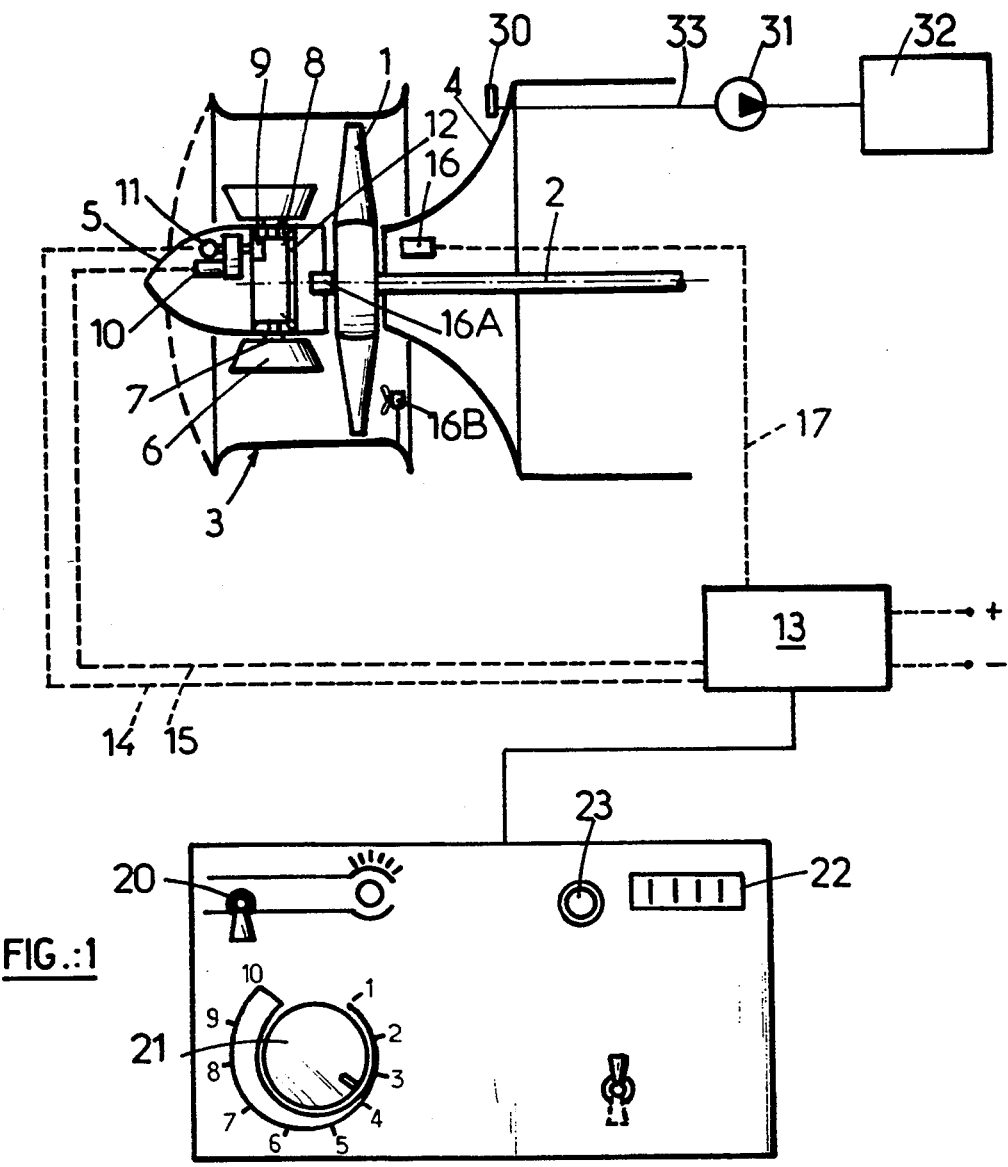
FIG.:1
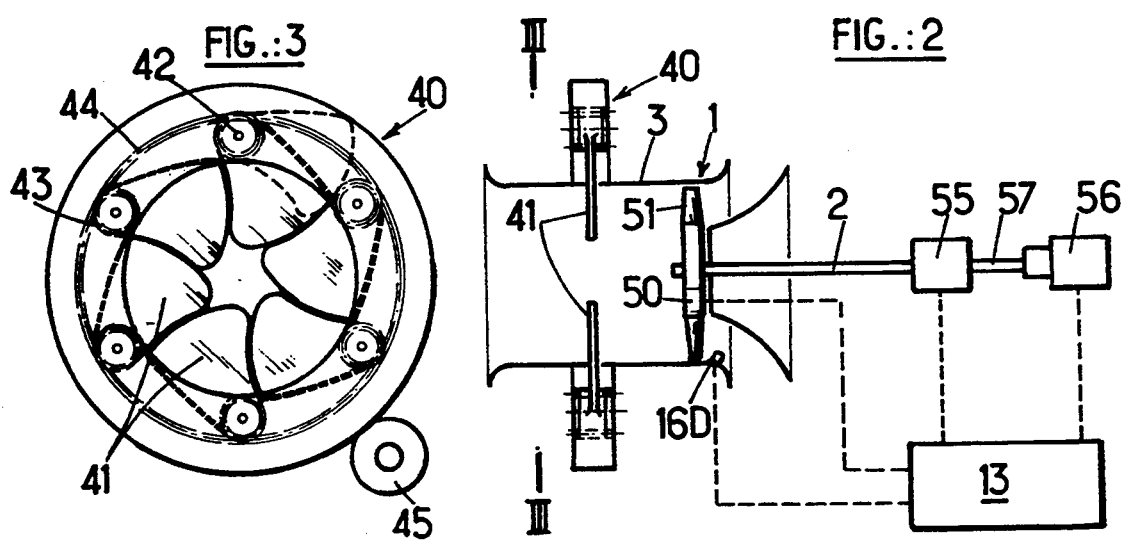
FIG.:3  FIG.:2

APPARATUS FOR TREATMENT OF VEGETATION

CROSS REFERENCE TO RELATED APPLICATION

This application is a continuation-in-part of application Ser. No. 767,899, filed Sept. 30, 1991, now abandoned.

BACKGROUND OF THE INVENTION

The present invention relates to an apparatus for the treatment of vegetation that includes a blower which is capable of producing a current of air, and means for atomising a treatment product in the current of air.

At present, apparatuses of this type which are found on the market are equipped with in axial or centrifugal blower, driven by the power take-off of a tractor by means of a mechanical transmission, or even by means of a hydraulic transmission comprising a pump, usually driven by the power take-off, and feeding a hydraulic engine by means of pipes under pressure.

It is even possible to find, although more rarely, blowers driven by an electric generator. Means, such as a gearbox, make it possible, in certain cases, to change when stationary the ratio between the speed of the power take-off of the tractor and the speed of rotation of the blower. Also found are blowers whose pitch can be changed when stationary.

When it is desired to treat plants, such as fruit trees, of a certain height, it is important that the output of the blower does not vary with the speed of the engine of the tractor. In the opposite case, there is a danger that the top of the trees will not be reached during slowing down and, on the contrary, that the air current will go too far during acceleration.

U.S. Pat. No. 4.609,145 in the name of Allen L. Miller describes a device which makes it possible to vary the speed of rotation of the blower of an apparatus for spreading pesticides, by virtue of a control located in the driver's cab, this control operating the feed valve of a hydraulic engine which operates the blower. Usually, the pressure of the feed fluid of a hydraulic engine mounted on a tractor is provided by a pump operated by the power take-off of the tractor. This means that, if the tractor has a reduction in speed, the output of the blower will be reduced also. It will thus be precisely at the moment when the driver of the tractor has to make a turn, for example, or face a difficulty, that the output of the blower will deviate from the value envisaged, and that it will be necessary, moreover, to monitor the speed of the latter. This arrangement, as can be seen, is not satisfactory.

SUMMARY OF THE INVENTION

The aim of the present invention is thus to provide an apparatus of the type indicated in the introduction, which makes it possible to ensure a jet of air of constant power, independently of the drive means of the blower.

To obtain this result, the apparatus according to the invention comprises at least one sensor which is capable of measuring continuously the speed of rotation of the blower or the flow of the current of air which it produces, means for varying the speed of rotation and/or the characteristics of the blower, and means for controlling these variations as a function of the signals from the sensor and of a set value.

The sensor can be sensitive to the drive speed of the blower. It will then be an apparatus of tachometer type, either connected to the drive of the blower, or operated by the blower itself.

According to another embodiment, the sensor is located in the current of air and is sensitive to the speed or to the pressure of the latter. In this case, the sensor can comprise a Pitot tube, or a "wind meter" comprising a small inductive turbine; these two types of sensor are available on the market.

According to an embodiment which is particularly simple and advantageous from a the financial point of view, the means for varying the speed of rotation and/or the characteristics of the blower comprise blades, or vanes, of variable orientation located on the suction of the blower. A simple mechanical means will be capable of controlling the orientation of the vanes, and thus acting effectively on the air flow produced, as a function of data collected by the sensor.

It is possible to arrange, in place of the vane device, flaps which are approximately perpendicular to the flow of suction air, mounted on pivots parallel to this flow and formed so as to create a suction passage of variable cross-section, in the manner of the adjustable diaphragms of certain cameras. This solution is of approximately comparable price to the previous one, and the adoption of one or the other may be the result of aerodynamic considerations.

According to an embodiment which is slightly more expensive, but perfected at present, the blower comprises a propeller, and use is made of means for varying in operation the pitch of the propeller.

It is even possible to make use of means acting directly on the speed of rotation of the blower, for example a mechanical transmission with variable gear reduction, or a hydraulic transmission with variable output, or even, in a case in which the blower is driven by an electric motor, to equip the latter with a variable speed drive.

A person skilled in the art will understand that a certain number of these various methods can be used simultaneously.

BRIEF DESCRIPTION OF THE DRAWINGS

FIG. 1 shows an apparatus according to one embodiment of the present invention,

FIG. 2 shows an alternative embodiment, and

FIG. 3 is a cross-section along line III—III of FIG. 2.

DETAILED DESCRIPTION OF THE PREFERRED EMBODIMENTS

FIG. 1 shows a propeller 1, mounted on a shaft 2 connected by means (not shown) to the power take-off of a tractor (likewise not shown), the propeller being mounted inside a tube 3 for guiding the current of air. A deflector 4 diverts the current of air created by the propeller in order to send it in a direction perpendicular to that of the shaft 2. A treatment product from a tank 32 is pumped by pump 31 through a duct 33 to a nozzle 30 for discharge into the current of air. On the intake side of the a fixed dome 5, arranged axially in relation to the propeller 1, supports vanes 6 which are distributed equally around the axis and two of which are shown in the figure. The dome further contains means for controlling the orientation of the vanes. The latter are each mounted on a shaft 7 which is perpendicular to the shaft 2 of the propeller and which supports a ring gear 8 which engages on a drive pinion 9, the axis of which is parallel to the shaft 2 and which is mounted on a geared motor 10 which is capable of driving it at low speed: two revolutions per minute. A position sensor 11 makes it possible to know at any moment the exact position of the vanes. A ring gear 12, which engages on the gears 8, ensures the synchronisation of the movements of all the vanes.

A control box 13 is connected on the one hand to the position sensor 11 by means of a cable 14, and to the geared motor 10 by means of a feed cable 15.

Furthermore, the box is connected to an electromagnetic sensor 16 of the speed of the propeller by a cable 17. In an alternative, the sensor 16 is replaced by a tachometric dynamo 16A located at the end of the shaft 2. In another alternative, the sensor 16 is replaced by a fan 16B located on the delivery of the blower 1.

In the lower part of FIG. 1, the display part of the control box 13 is shown. Reference 20 designates a switch for application of voltage and reference 21 represents the control of the potentiometer which makes it possible to choose the desired air flow. 22 designates a panel for display of the speed of air conduction. 23 designates an alarm indicator which emits a luminous signal when the speed of the blower exceeds a limit chosen in advance, the vanes having reached the end of their travel.

Operation is as follows: the blower is made to rotate at its nominal speed, for example 2200 revolutions/minute, then the operator adjusts the air flow to the desired power by action on the potentiometer control 21, which acts by means of the control box 13. If use is made of a sensor 16, 16A which is sensitive to the speed of rotation of the blower, a program preset in the factory makes the geared motor 10 rotate by an angle linked to the separation between the actual speed and the nominal speed by a law, for example a proportional law.

If use is made of a sensor 16B sensitive to the air flow, the control box 13 compares the air flow measured at each moment with the envisaged air flow, established with the aid of the control 21, and orders a displacement of the vanes 6, by rotation of the geared motor 10, until the separation falls below a value fixed in advance.

In both cases, preparation of the electrical diagram of the control box is sufficiently simple to be within the scope of any person skilled in the art.

Referring now to FIGS. 2 and 3, they show some features which differ from those of FIG. 1. The features of FIGS. 2-3 are not necessarily combined altogether in the same apparatus. They can also be combined with features of FIG. 1, as it will be understood by any person skilled in the art. The same references designate the same components in all the figures.

Reference 40 denotes a device for varying the cross-section of the suction passages consisting of tube 3 of the blower. It comprises a plurality of flaps 41, each mounted on a pivot 42 parallel to the flow of suction air. Each flap 41 has teeth 43 which engage a toothed wheel 44 driven by a motor 45. A rotation of the toothed wheel 44 rotates the flaps 41 from a position where each of them obturate partially the suction passage, or tube 3, to a position (shown in dashed line) where said suction passage is unobstructed.

The structure of this device is substantially identical to that of the adjustable diaphragm of photographic apparatuses, which have been in use for decades.

In FIG. 2, the propeller 1 comprises a support 50 which carries blades 51, each mounted for rotation on an axis perpendicular to that of the shaft 2 for varying the pitch of the propeller. Sixty years ago, aircraft were provided with devices for varying the pitch of propellers during their rotation, therefore it does not appear as necessary to disclose the structure of the support 50.

Reference 55 can represent either a mechanical transmission with variable year reduction or a hydraulic transmission of variable output. Transmission 55 in connected to the propeller by the shaft 2, and to a motor 56 with variable speed drive by another shaft 57.

A sensor 16D is placed in the current of air propelled by the propeller 1, and is sensible to the pressure. It is connected to the control box 13, which in turn controls the motor 45 for pivoting the flaps 41, the support 50 for rotating the blades 51, the transmission 45 and/or the motor 56 with variable speed drive.

I claim:

1. An apparatus for the treatment of vegetation, comprising a tube through which a current of air flows, means for atomizing a treatment product in said current of air; a blower for projecting said current of air containing said treatment product towards vegetation to be treated, said tube and said blower defining a geometrical cross section; drive means for said blower; a sensor for measuring a parameter related to the power of the current of air; and controlling means for controlling said geometrical cross section as a function of signals from the sensor and a set value.

2. The apparatus as claimed in claim 1, wherein said sensor is located in the current of air and is sensitive to one of the speed of the current of air and the pressure of the current of air.

3. The apparatus as claimed in claim 1, wherein said controlling means comprise blades or vanes of variable orientation located on a suction side of the blower.

4. The apparatus as claimed in claim 1, wherein said controlling means comprise flaps which are approximately perpendicular to the flow of suction air of the blower, mounted on pivots parallel to this flow and formed so as to create a suction passage of variable cross-section.

5. The apparatus as claimed in claim 1, wherein the blower comprises a propeller, and said controlling means comprise means for varying in operation the pitch of said propeller.

6. An apparatus for the treatment of vegetation, comprising a tube through which a current of air flows, means for atomizing a treatment product in said current of air; a blower for projecting said current of air containing said treatment product towards vegetation to be treated, said tube and said blower defining a geometrical cross section; drive means for said blower; a sensor for measuring a parameter related to the power of the current of air; and controlling means for controlling the speed of rotation of the blower as a function of signals from the sensor and a set value.

7. The apparatus as claimed in claim 6, wherein said sensor is sensitive to the drive speed of the blower.

8. The apparatus as claimed in claim 6, wherein said controlling means comprise a mechanical transmission with variable gear reduction.

9. The apparatus as claimed in claim 6, wherein said controlling means comprise a hydraulic transmission of variable output.

10. The apparatus as claimed in claim 6, wherein said controlling means comprise an electric motor with a variable speed drive.

* * * * *